(12) United States Patent
Roth et al.

(10) Patent No.: US 9,333,881 B2
(45) Date of Patent: May 10, 2016

(54) VEHICLE SEAT

(75) Inventors: Michael Roth, Sembach (DE); Markus Jung, Bosenbach (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 155 days.

(21) Appl. No.: 14/122,967

(22) PCT Filed: May 23, 2012

(86) PCT No.: PCT/EP2012/002189
§ 371 (c)(1),
(2), (4) Date: Jan. 18, 2014

(87) PCT Pub. No.: WO2012/163493
PCT Pub. Date: Dec. 6, 2012

(65) Prior Publication Data
US 2015/0035334 A1    Feb. 5, 2015

(30) Foreign Application Priority Data
Jun. 1, 2011   (DE) .......................... 10 2011 103 225

(51) Int. Cl.
*A47C 1/00* (2006.01)
*B60N 2/06* (2006.01)
*B60N 2/02* (2006.01)
(Continued)

(52) U.S. Cl.
CPC   *B60N 2/06* (2013.01); *B60N 2/005* (2013.01); *B60N 2/0232* (2013.01); *B60N 2/067* (2013.01); *B60N 2/14* (2013.01)

(58) Field of Classification Search
CPC .............................. A47C 3/18; B60N 2/0715
USPC .............................. 297/344.24, 344.21, 344.1
See application file for complete search history.

(56) References Cited

U.S. PATENT DOCUMENTS

| 4,834,452 | A | * | 5/1989 | Goodrich | 297/240 |
| 5,292,178 | A | * | 3/1994 | Loose et al. | 297/344.1 |
| 5,524,952 | A | * | 6/1996 | Czech et al. | 296/65.12 |

(Continued)

FOREIGN PATENT DOCUMENTS

| CN | 201333952 Y | 10/2009 |
| DE | 689 05 521 T2 | 11/1993 |

(Continued)

OTHER PUBLICATIONS

International Search Report mailed Aug. 17, 2012, as received in corresponding International Patent Application No. PCT/EP2012/002189.

(Continued)

*Primary Examiner* — David E Allred
*Assistant Examiner* — Alexander Harrison
(74) *Attorney, Agent, or Firm* — Foley & Lardner LLP

(57) ABSTRACT

A vehicle seat having a seat shell, includes a first upper rail, which is arranged on the tunnel side and is movably guided in a first lower rail, and a second upper rail, which is arranged on the sill side and is movably guided in a second lower rail. The first upper rail can be displaced relative to the second upper rail, and due to that displacement the seat shell carries out a rotation about a vertically extending pivot axis. A main memory device is provided on the second upper rail, and at least one spring unit is provided, which acts upon the first upper rail relative to the second upper rail in the longitudinal direction.

13 Claims, 3 Drawing Sheets

Figure 1:
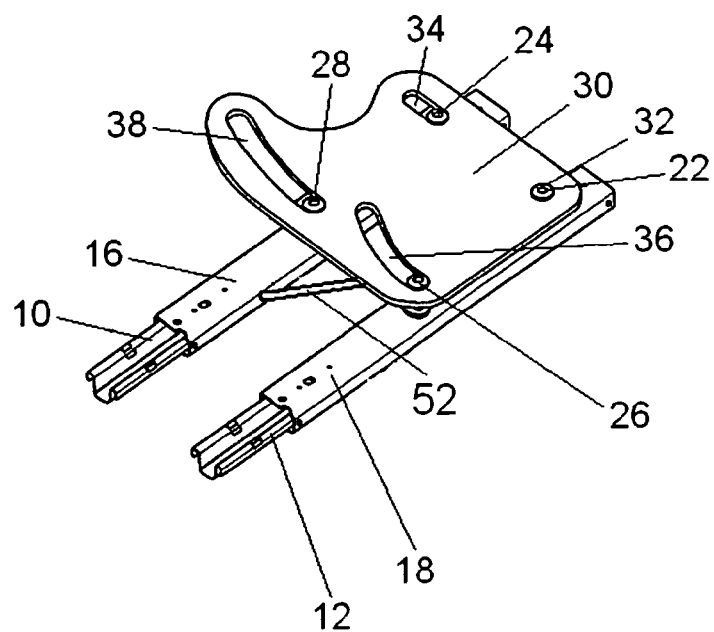

(51) Int. Cl.
  *B60N 2/14* (2006.01)
  *B60N 2/005* (2006.01)

(56) References Cited

U.S. PATENT DOCUMENTS

| | | | | |
|---|---|---|---|---|
| 5,597,206 | A * | 1/1997 | Ainsworth et al. | 297/378.12 |
| 5,683,140 | A * | 11/1997 | Roth et al. | 297/344.1 |
| 5,704,729 | A * | 1/1998 | Carnahan et al. | 403/322.1 |
| 5,853,221 | A * | 12/1998 | Thoman et al. | 297/344.24 |
| 6,325,456 | B1 * | 12/2001 | Carnahan | 297/344.24 |
| 6,402,114 | B1 * | 6/2002 | Carnahan et al. | 248/425 |
| 6,439,531 | B1 * | 8/2002 | Severini et al. | 248/423 |
| 6,474,739 | B1 * | 11/2002 | Lagerweij | 297/341 |
| 6,857,702 | B2 * | 2/2005 | Becker et al. | 297/341 |
| 7,845,703 | B2 * | 12/2010 | Panzarella et al. | 296/65.11 |
| 7,850,242 | B2 * | 12/2010 | Taguchi et al. | 297/344.24 |
| 8,205,945 | B2 | 6/2012 | Ma et al. | |
| 8,408,651 | B2 * | 4/2013 | Maier | 297/344.24 |
| 8,998,326 | B2 * | 4/2015 | DeCraene et al. | 297/344.24 |
| 2004/0026974 | A1 * | 2/2004 | Severini et al. | 297/344.1 |
| 2007/0246987 | A1 * | 10/2007 | Sano et al. | 297/344.24 |
| 2008/0042480 | A1 * | 2/2008 | Volkman et al. | 297/344.21 |
| 2012/0200132 | A1 * | 8/2012 | Collene et al. | 297/344.21 |
| 2013/0127221 | A1 * | 5/2013 | Seibold et al. | 297/344.24 |
| 2014/0138997 | A1 * | 5/2014 | Schulz et al. | 297/344.24 |

FOREIGN PATENT DOCUMENTS

| | | |
|---|---|---|
| DE | 102005 0 41 735 A1 | 3/2007 |
| DE | 10 2009 022 979 B3 | 8/2010 |
| DE | 10 2009 033 494 A1 | 1/2011 |
| JP | 2006-143173 A | 6/2006 |

OTHER PUBLICATIONS

Notification of Transmittal of Translation of the International Preliminary Report on Patentability mailed Dec. 12, 2013, as received in corresponding International Patent Application No. PCT/EP2012/002189.

Office Action dated Apr. 30, 2015, received in corresponding Chinese application No. 201280024871.6, 5 pages.

* cited by examiner

VEHICLE SEAT

CROSS REFERENCE TO RELATED APPLICATIONS

The present application is a U.S. National Stage of International Application No. PCT/EP2012/002189 filed on May 23, 2012, which claims the benefit of German Patent Application No. 10 2011 103 225.1 filed on Jun. 1, 2011, the entire disclosures of all of which are incorporated herein by reference.

The invention relates to a vehicle seat, in particular a motor vehicle seat, in accordance with the preamble of claim 1.

PRIOR ART

DE 10 2009 033 494 A1 has disclosed a vehicle seat of the generic type which has a seat shell and two rail pairs which run parallel to one another in the longitudinal direction. Here, the seat shell can be rotated about a vertical pivot axis. Said rotation is achieved by virtue of the fact that the two top rails of the rail pairs which are provided for longitudinal adjustment can be displaced relative to one another.

A vehicle seat of this type is preferably equipped with two electric motors for driving the two top rails. As an alternative, however, a vehicle seat of this type can also be actuated manually. In this case, each of the top rails has a locking device which can be unlocked separately.

As a result of unlocking of one of the two locking devices and displacing of one top rail relative to the other top rail, the seat shell of the vehicle seat can then be rotated about the pivot axis, as a result of which ingress and egress are facilitated. As a result of unlocking of both locking devices at the same time, the vehicle seat can be displaced in the longitudinal direction.

Problem

The invention is based on the problem of improving a vehicle seat of the type mentioned at the outset.

Solution

According to the invention, this problem is solved by way of a vehicle seat having the features mentioned in claim 1. Advantageous refinements which can be used individually or in combination with one another are the subject matter of the subclaims.

According to the invention, a main memory apparatus is provided on the top rail which is arranged on the sill side. Memory apparatuses of this type are also used, for example, in three-door vehicles in order to ensure the easy entry function. Said main memory apparatus stores a previously set longitudinal position of the sill-side top rail and prevents said top rail from being displaced toward the rear, that is to say counter to the driving direction, beyond the stored longitudinal position. Furthermore, at least one spring unit is provided which loads the tunnel-side top rail in the longitudinal direction relative to the sill-side top rail.

In a driving position of the vehicle seat according to the invention, the tunnel-side top rail can be displaced toward the front, that is to say in the driving direction, relative to the sill-side top rail by way of simultaneous unlocking of both locking devices, the main memory apparatus preventing a displacement of the sill-side top rail toward the rear. As a result of said displacement, the seat shell experiences a rotation about the vertical pivot axis. As a result of the loading by the spring unit, the sill-side top rail is displaced relative to the tunnel-side top rail, and the rotational movement of the seat shell is therefore assisted by the force of the spring unit.

As a result of the subsequent displacement of both top rails at the same time in the driving direction, the seat shell moves away from disruptive body parts, for example a B pillar of the motor vehicle, and moves closer to the door opening. In this position which is denoted as the egress position, ingress and egress are facilitated yet further. If the seat shell is subsequently displaced back toward the rear, the main memory apparatus ensures that the sill-side top rail comes to a standstill in the previously stored longitudinal position. If the seat shell is then rotated back again, the vehicle seat is situated in the originally set driving position again.

According to one preferred embodiment of the invention, the spring unit is arranged directly between the first top rail and the sill-side top rail.

According to one advantageous refinement of the invention, an additional memory apparatus is provided on the tunnel-side top rail.

Said additional memory apparatus on the tunnel-side rail prevents, in particular in the case of the rotation of the seat shell mentioned above, a movement of the tunnel-side top rail toward the rear beyond the stored longitudinal position and therefore facilitates finding of the original driving position, in which the top rails are situated at the same level, that is to say without offset with respect to one another, in the longitudinal direction.

The two memory apparatuses are preferably activated at the same time, in particular during a rotation of the seat shell about the vertically running pivot axis.

Here, the spring unit which is preferably arranged between the two top rails preferably loads the tunnel-side top rail in the driving direction relative to the sill-side top rail.

The spring unit which is preferably configured as a gas pressure spring can advantageously be blocked. In the case of a blocked spring unit, unintended rotation of the seat shell during a pure longitudinal setting of the vehicle seat is prevented.

According to one advantageous refinement of the invention, a bracket rests on the top rails, which bracket is mounted on the sill-side top rail such that it can be rotated about a vertically running rotational axis. Here, the seat shell is preferably mounted on the bracket.

The rotational axis, about which the bracket can be rotated, is preferably aligned with the pivot axis, about which the seat shell can be rotated.

According to one alternative embodiment of the invention, the spring unit is arranged between the tunnel-side top rail and the bracket. To this end, the spring unit comprises, for example, a compression spring or a tension spring which loads the bracket relative to the tunnel-side top rail.

According to a further alternative embodiment of the invention, the spring unit is arranged between the sill-side top rail and the bracket. To this end, the spring unit comprises, for example, a torsion spring which is wound around the rotational axis of the bracket and loads the bracket relative to the sill-side top rail.

It is also conceivable to provide a plurality of spring units at different locations.

Further advantageous refinements of the invention can be gathered from the further subclaims.

FIGURES AND EMBODIMENTS OF THE INVENTION

Figure 2:
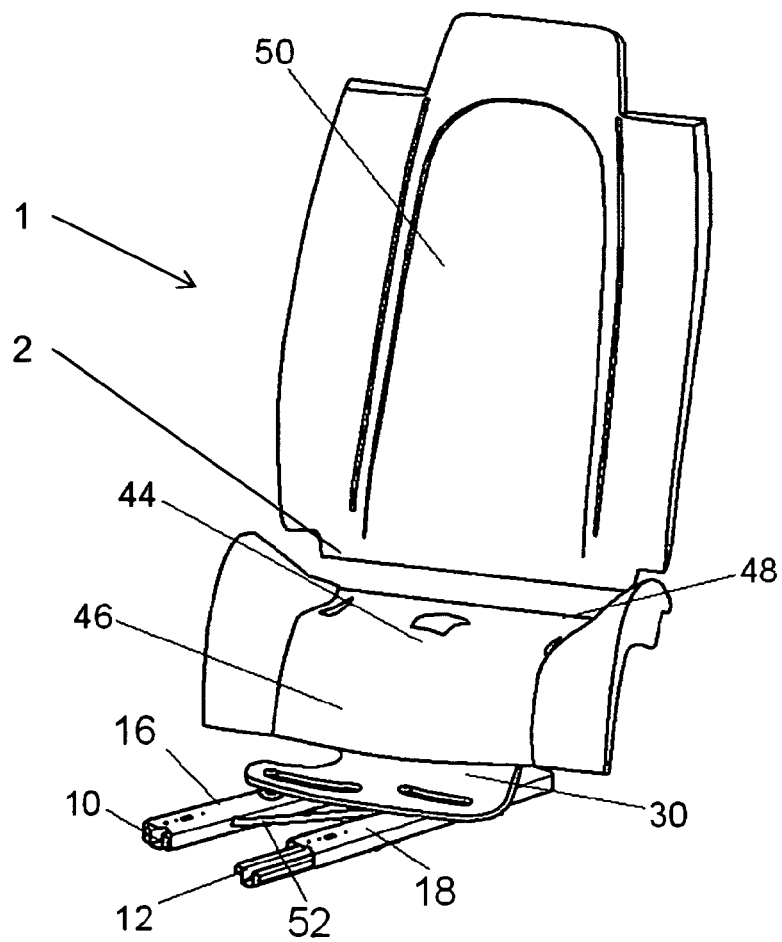
Figure 3:
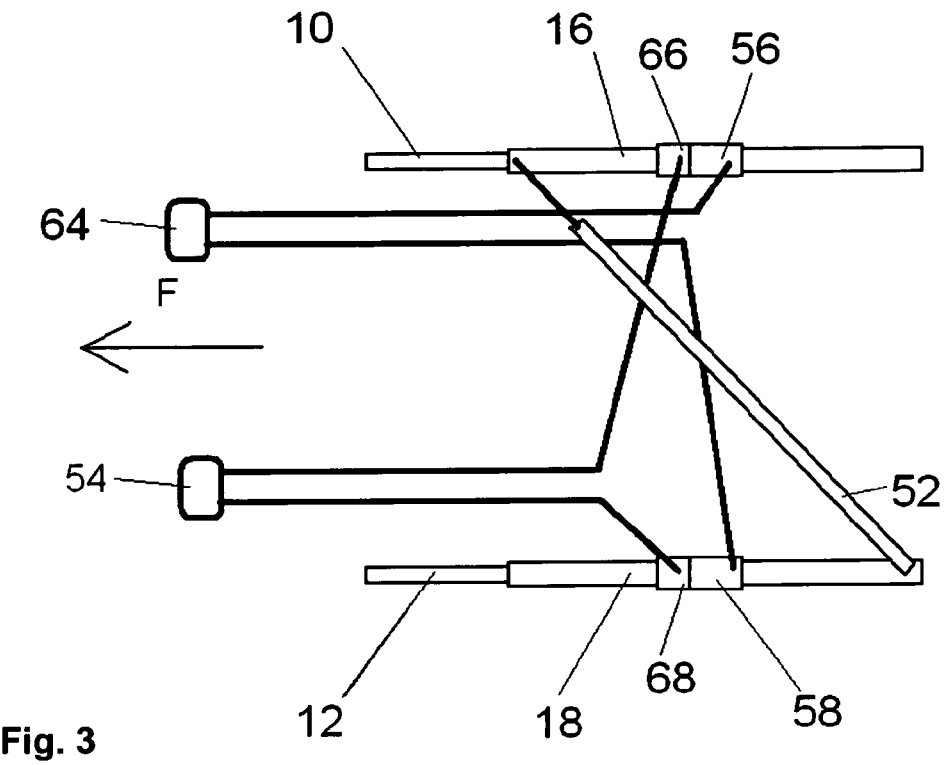
Figure 4:
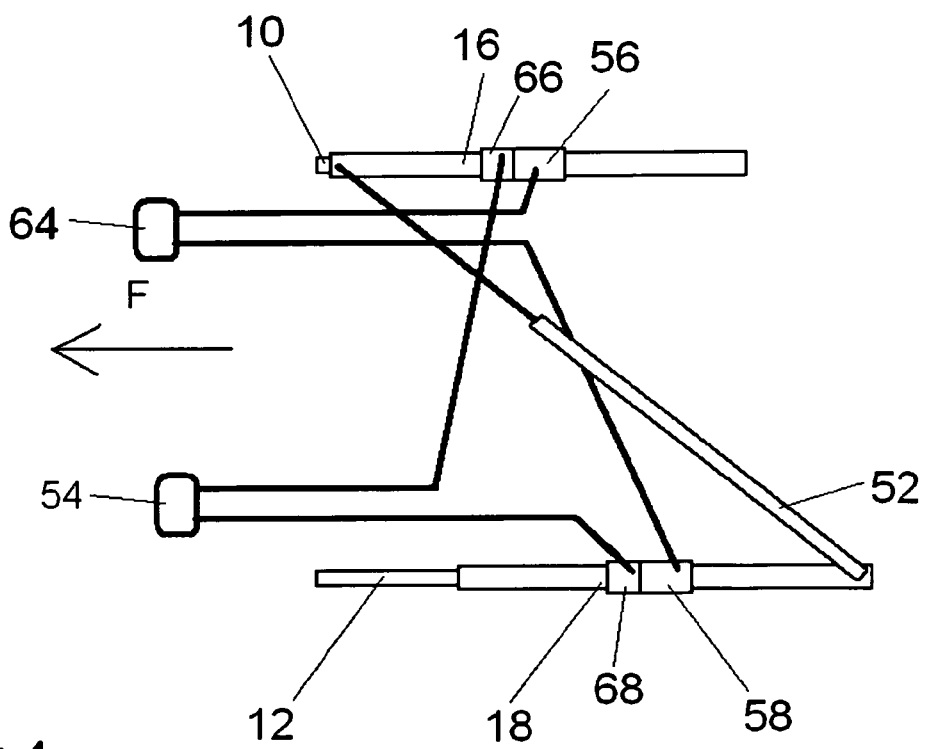
Figure 5:
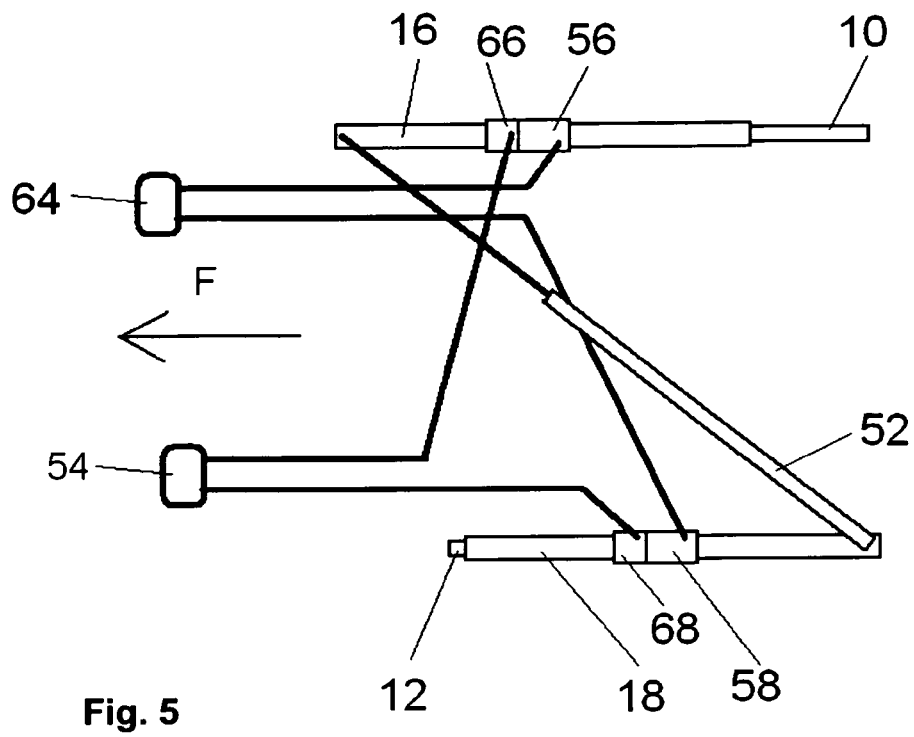
Figure 6:
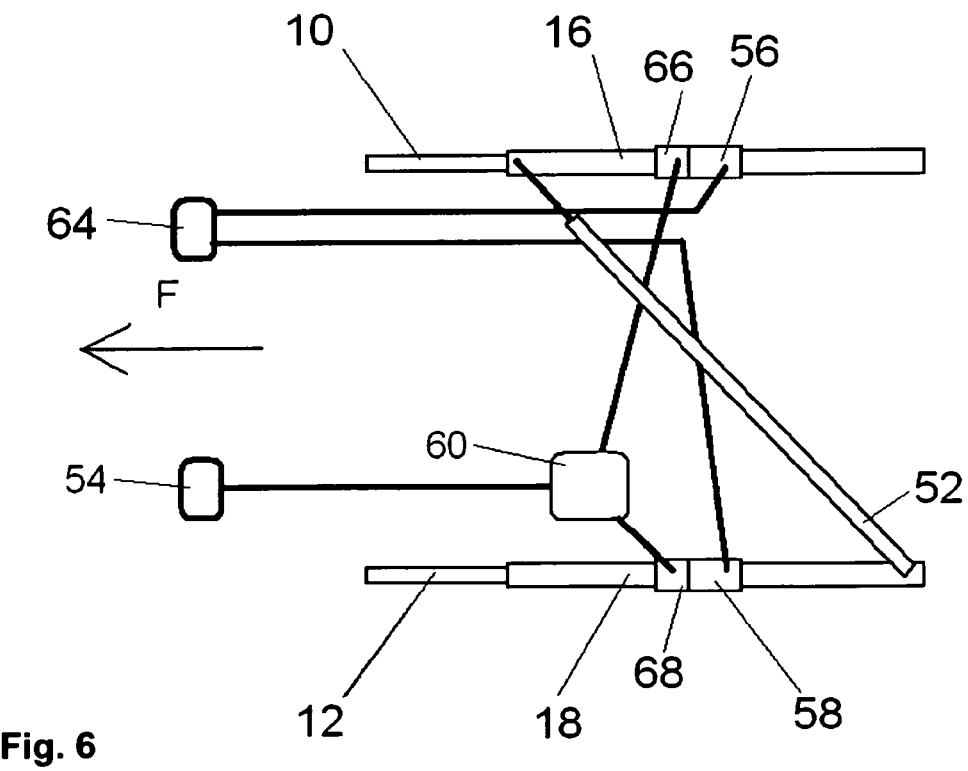

In the following text, the invention is explained in greater detail using advantageous exemplary embodiments which are shown in the drawings. However, the invention is not restricted to said exemplary embodiments. In the drawings:

FIG. 1 shows a perspective illustration of a base frame of a vehicle seat in the driving position, FIG. 2 shows a perspective illustration of a vehicle seat in the pivoted position, FIG. 3 shows a diagrammatic illustration of a base frame without bracket in the driving position, according to a first exemplary embodiment, FIG. 4 shows a diagrammatic illustration of a base frame without bracket in the pivoted position, according to the first exemplary embodiment, FIG. 5 shows a diagrammatic illustration of a base frame without bracket in the egress position, according to the first exemplary embodiment, and FIG. 6 shows a diagrammatic illustration of a base frame without bracket in the driving position, according to a second exemplary embodiment.

FIG. 1 shows a base frame of a vehicle seat 1 according to the invention in the driving position.

A first bottom rail 10 and a second bottom rail 12 are fastened parallel to one another to a vehicle floor. A first top rail 16 is guided movably in the first bottom rail 10. A second top rail 18 is likewise guided movably in the second bottom rail 12. The movement direction of the top rails 16, 18 with regard to the bottom rails 10, 12 is called the longitudinal direction.

In this example, the longitudinal direction runs parallel to the driving direction F. The top rails 16, 18 can therefore be displaced in the driving direction F and counter to the driving direction F. It is also conceivable to arrange the bottom rails 10, 12 in an oblique or inclined manner with respect to the driving direction F. In this case, the top rails 16, 18 can be displaced in an oblique or inclined manner with respect to the driving direction F.

The bracket 30 rests on the top rails 16, 18 and is fastened to them. A seat shell (not shown here) is mounted on the bracket 30. In this example, the bracket has the shape of a flat plate which extends substantially in the longitudinal direction and in a direction which runs perpendicularly with respect thereto and is called the transverse direction.

As a result of synchronous displacement of the first top rail 16 and the second top rail 18 relative to the bottom rails 10, 12, the bracket 30 experiences a displacement in the longitudinal direction.

A direction which runs perpendicularly with respect to the longitudinal direction and perpendicularly with respect to the transverse direction is called the vertical direction in the following text.

The bracket 30 has a hole 32, through which a pivot pin 22 protrudes which is fastened to the second top rail 18. The bracket 30 is therefore mounted on the second top rail 18 such that it can be rotated about the center axis of the pivot pin 22.

Furthermore, the bracket 30 has a first recess 34, through which a first pin 24 protrudes which is fastened to the first top rail 16. In this example, the first recess 34 has the shape of a straight slot which runs in the transverse direction and has a width which corresponds to the diameter of the first pin 24. The first recess 34 can also extend obliquely with respect to the transverse direction. Another design, for example a curved design, is also conceivable.

Moreover, the bracket 30 has a second recess 36, through which a second pin 26 protrudes which is fastened to the second top rail 18. The second recess 36 has the design of a slot in the form of a circular segment with a width which corresponds to the diameter of the second pin 26. The radius of said circular segment corresponds to the spacing of the center axis of the pivot pin 22 from the center axis of the second pin 26.

Furthermore, the bracket 30 has a third recess 38, through which a third pin 28 protrudes which is fastened to the first top rail 16. The third recess 38 has the shape of a curved slot with a width which corresponds to the diameter of the third pin 28.

Furthermore, each of the top rails 16, 18 has in each case one locking device 66, 68. By means of the first locking device 66, the first top rail 16 can be locked to the first bottom rail 10. By means of the second looking device 68, the second top rail 18 can be locked to the second bottom rail 12.

In the present case, both locking devices 66, 68 can be unlocked together and at the same time in a known way by means of an unlocking unit. To this end, for example, the vehicle seat 1 has an unlocking handle 64 which is connected via in each case one Bowden cable to the locking devices 66, 68. As a result of pulling on said unlocking handle 64, both locking devices 66, 68 are therefore unlocked and the top rails 16, 18 can be displaced in the longitudinal direction in the respective bottom rail 10, 12.

The second top rail 18 has a main memory apparatus 58 which will be described in greater detail later. The first top rail 16 likewise has an additional memory apparatus 56 which will be described in greater detail later. Furthermore, an actuating handle 54 for joint actuation of the memory apparatuses 56, 58 is provided.

Said memory apparatuses 56, 58 serve to store a previously set longitudinal position of the top rails 16, 18 relative to the bottom rails 10, 12. A memory apparatus of this type is described, for example, in EP 1 474 308 B1.

A spring unit 52 is attached diagonally between the first top rail 16 and the second top rail 18. Here, the spring unit 52 is mounted in each case rotatably in the front region in the driving direction F on the first top rail 16 and in the rear region in the driving direction F on the second top rail 18. In the present case, the spring unit 52 is configured as a gas pressure spring which can be blocked and in which a piston rod is guided linearly in the axial direction in a cylinder. However, other embodiments are also conceivable.

In the normal driving position, the spring unit 52 is blocked, that is to say the piston rod cannot be moved relative to the cylinder. Upon actuation of the unlocking handle 64 for the longitudinal setting of the vehicle seat 1, the spring unit 52 remains blocked. Upon actuation of the unlocking handle 64, the memory apparatus 56, 58 is reset and the newly set longitudinal position is stored.

The center axes of the pivot pin 22 and the pins 24, 26, 28 run parallel to one another in the vertical direction. The recesses 34, 36, 38 are configured in such a way that, during a displacement of the first top rail 16 relative to the second top rail 18 in the longitudinal direction, a rotation of the bracket 30 about the center axis of the pivot pin 22 is made possible.

If, from the driving position, a displacement of this type of the first top rail 16 relative to the second top rail 18 takes place in the driving direction F, the bracket and the seat shell which is attached thereto experience a rotation about the pivot pin 22 counter to the clockwise direction.

FIG. 2 shows a vehicle seat 1 according to the invention in a pivoted position of this type. The exemplary embodiment which is shown here is the driver's seat of a left-hand-drive vehicle.

A seat cushion 44 is fastened on the bracket 30, which seat portion 44 has a front end 46 in the longitudinal direction and a rear end 48 in the longitudinal direction. A backrest 50 is arranged in the region of the rear end 48 of the seat cushion 44. The seat cushion 44 and the backrest 50 form a seat shell 2. In the driving position, the front end 46 of the seat cushion 44 points approximately in the driving direction and the rear end 48 of the seat cushion 44 points approximately counter to the driving direction.

A movement of a top rail 16, 18 in the direction of the front end 46 of the seat cushion 44 therefore corresponds to a movement approximately in the driving direction F and is called a forward movement in the following text. A movement of a top rail 16, 18 in the direction of the rear end 48 of the seat cushion 44 corresponds to a movement approximately counter to the driving direction and is called a rearward movement in the following text.

In the exemplary embodiment which is selected, the first top rail 16 and the first bottom rail 10 are situated to the right of the second top rail 18 and the second bottom rail 12 as viewed in the driving direction. The first top rail 16 and the first bottom rail 10 are therefore arranged on the tunnel side, that is to say facing a tunnel which runs in the vehicle center. The second top rail 18 and the second bottom rail 12 are arranged on the sill side, that is to say facing a sill which runs on the vehicle outer side and a vehicle door.

A rotation of the bracket 30 about the pivot pin 22 counter to the clockwise direction takes place when the first top rail 16 moves in the forward direction relative to the second top rail 18. Here, the seat cushion 44 and the backrest 50 experience the same rotation, as a result of which the front end 46 of the seat cushion 44 approaches the driver's door. A rotation of the bracket 30 in the clockwise direction takes place when the first top rail 16 moves in the rearward direction relative to the second top rail 18.

FIGS. 3 to 5 show the sequence of a combined rotational/longitudinal movement using the respective positions of the base frame of the vehicle seat 1 in a first exemplary embodiment. Here, the seat shell 2 and the bracket 30 are not shown.

In the driving position, the first top rail 16 and the second top rail 18 are situated at the same level in the longitudinal direction, that is to say without offset with respect to one another, and are locked to the bottom rails 10, 12 by means of the locking devices 66, 68.

As a result of actuation of the actuating handle 54, the locking devices 66, 68 are unlocked, and the top rails 16, 18 can therefore be moved in the longitudinal direction relative to the bottom rails 10, 12. At the same time, the blocking of the spring unit 52 is released.

Here, the memory apparatuses 56, 58 are activated. This means that the current longitudinal position is stored in both memory apparatuses 56, 58, both memory apparatuses 56, 58 prevent a movement counter to the driving direction F, and both memory apparatuses 56, 58 sense a following movement in the driving direction F.

The spring unit 52 which is configured as a gas pressure spring extends in the axial direction, by the piston rod being pressed out of the cylinder. As a result, the first top rail 16 is moved in the driving direction F relative to the second top rail 18 and relative to the first bottom rail 10. As a result, the bracket and the seat shell experience a rotation about a vertical pivot axis counter to the clockwise direction. Here, the main memory apparatus 58 prevents a movement of the second top rail 18 counter to the driving direction F. The additional memory apparatus 56 senses said movement of the first top rail 16 relative to the first bottom rail 10.

Said rotation ends when the pins 24, 26, 28 come into contact at the end regions of the associated recesses 34, 36, 38 of the bracket 30. The vehicle seat 1 is then situated in the pivoted position. A further rotation counter to the clockwise direction is not possible.

In the pivoted position and in the driving position, the second top rail 18 is situated in each case in the same longitudinal position in relation to the second bottom rail 12.

The vehicle seat 1 can then be displaced in the driving direction F, that is to say toward the front, until the desired egress position is reached. Here, the first top rail 16 and the second top rail 18 move synchronously in the driving direction relative to the bottom rails 10, 12. The additional memory apparatus 56 and the main memory apparatus 58 sense said movements of the top rails 16, 18 relative to the bottom rails 10, 12. The movement of the vehicle seat 1 toward the front ends at the latest when the first top rail 16 reaches a front end stop on the first bottom rail 10.

If the actuating handle 54 is released when the desired egress position is reached, the locking devices 66, 68 are locked, and the top rails 16, 18 are therefore locked relative to the bottom rails 10, 12. The spring unit 52 is also blocked again. The memory apparatuses 56, 58 remain activated.

In the pivoted position and in the egress position, the second top rail 18 has in each case the same offset with respect to the first top rail 16 in the longitudinal direction.

As a result of renewed actuation of the actuating handle 54, the locking devices 66, 68 are unlocked again and the top rails 16, 18 can therefore be moved again in the longitudinal direction relative to the bottom rails 10, 12. At the same time, the blocking of the spring unit 52 is also released. The memory apparatuses 56, 58 remain activated.

The vehicle seat 1 can then be displaced counter to the driving direction F, that is to say toward the rear, until the pivoted position is reached again. Here, the first top rail 16 and the second top rail 18 move synchronously counter to the driving direction F relative to the bottom rails 10, 12. The additional memory apparatus 56 and the main memory apparatus 58 sense said movements of the top rails 16, 18 relative to the bottom rails 10, 12.

The pivoted position is reached when the main memory apparatus 58 senses the previously stored longitudinal position. The main memory apparatus 58 then prevents a further movement of the second top rail 18 toward the rear.

If an attempt is still made to push the vehicle seat 1 toward the rear, the first top rail 16 moves further toward the rear, while the second top rail 18 remains at a standstill. Here, the force also has to be overcome which is provided counter to said movement by the spring unit 52. Here, the seat shell of the vehicle seat 1 experiences a rotation about a vertical pivot axis in the clockwise direction.

This rotation ends when the additional memory apparatus 56 senses the previously stored longitudinal position.

The additional memory apparatus 56 then prevents a further movement of the first top rail 16 toward the rear. The original driving position is then reached again.

If the actuating handle 54 is then released, the locking devices 66, 68 are locked, and the top rails 16, 18 are therefore locked relative to the bottom rails 10, 12. The spring unit 52 is also blocked again. The memory apparatuses 56, 58 remain activated.

According to a second exemplary embodiment which is shown in FIG. 6, a holding unit 60 is provided which is operatively connected to the actuating handle 54, the spring unit 52 and to the locking devices 66, 68.

As a result of actuation of the actuating handle 54, the holding unit 60 is actuated which thereupon unlocks the locking devices 66, 68 and releases the blocking of the spring unit 52. After a comparatively small rotation of the seat shell of the vehicle seat 1 and a corresponding extension of the spring unit 52, the spring unit 52 blocks the holding unit 60. The locking devices 66, 68 therefore remain unblocked and the blocking of the spring unit 52 remains released. Even if the actuating handle 54 is then released, the vehicle seat 1 can be moved into the pivoted position and into the egress position and back again.

When the egress position is reached, the spring unit 52 is compressed again and therefore releases the holding unit 60. As a result, the spring unit 52 is blocked again and the locking devices 66, 68 are locked.

According to one inexpensive variant, the additional memory apparatus 56 on the tunnel-side first top rail can also be dispensed with. In this case, the rotation of the seat shell from the pivoted position into the driving position ends when the pins 24, 26, 28 come into contact at the end regions of the associated recesses 34, 36, 38 of the bracket 30. A further rotation in the clockwise direction is not possible.

The features which are disclosed in the above description, the claims and the drawings can be of significance individually and also in combination for the implementation of the invention in its various refinements.

LIST OF DESIGNATIONS

1 Vehicle seat
2 Seat shell
10 First bottom rail
12 Second bottom rail
16 First top rail
18 Second top rail
22 Pivot pin
24 First pin
26 Second pin
28 Third pin
30 Bracket
32 Hole
34 First recess
36 Second recess
38 Third recess
44 Seat cushion
46 Front end of the seat cushion
48 Rear end of the seat cushion
50 Backrest
52 Spring unit
54 Actuating handle
56 Additional memory apparatus
58 Main memory apparatus
60 Holding unit
64 Unlocking handle
66 First locking device
68 Second locking device
F Driving direction

The invention claimed is:

1. A vehicle seat having a seat shell, comprising:
a first top rail, which is arranged on a tunnel side and is guided movably in a first bottom rail;
a second top rail, which is arranged on a sill side and is guided movably in a second bottom rail, wherein the first top rail is configured to be displaced relative to the second top rail, and the seat shell experiencing a rotation about a vertically running pivot axis as a result of a displacement of the first top rail relative to the second top rail;
a main memory apparatus provided on the second top rail; and
at least one spring unit which loads the first top rail in the longitudinal direction relative to the second top rail.

2. The vehicle seat as claimed in claim 1, wherein the spring unit is arranged between the first top rail and the second top rail.

3. The vehicle seat as claimed in claim 1, wherein an additional memory apparatus is provided on the first top rail.

4. The vehicle seat as claimed in claim 3, wherein the two memory apparatuses are activated at the same time.

5. The vehicle seat as claimed in claim 3, wherein the two memory apparatuses are activated during a rotation of the seat shell around the vertically running pivot axis.

6. The vehicle seat as claimed in claim 1, wherein the spring unit loads the first top rail in the driving direction relative to the second top rail.

7. The vehicle seat as claimed in claim 1, wherein the spring unit is a gas pressure spring.

8. The vehicle seat as claimed in claim 1, wherein the spring unit can be blocked.

9. The vehicle seat as claimed in claim 1, wherein a bracket rests on the first and second top rails, which bracket is mounted on the second top rail such that it can be rotated about a vertically running rotational axis.

10. The vehicle seat as claimed in claim 9, wherein the seat shell is mounted on the bracket.

11. The vehicle seat as claimed in claim 9, wherein the rotational axis is aligned with the pivot axis.

12. The vehicle seat as claimed in claim 9, wherein the spring unit is arranged between the first top rail and the bracket.

13. The vehicle seat as claimed in claim 9, wherein the spring unit is arranged between the second top rail and the bracket.

* * * * *